Patented Sept. 18, 1928.

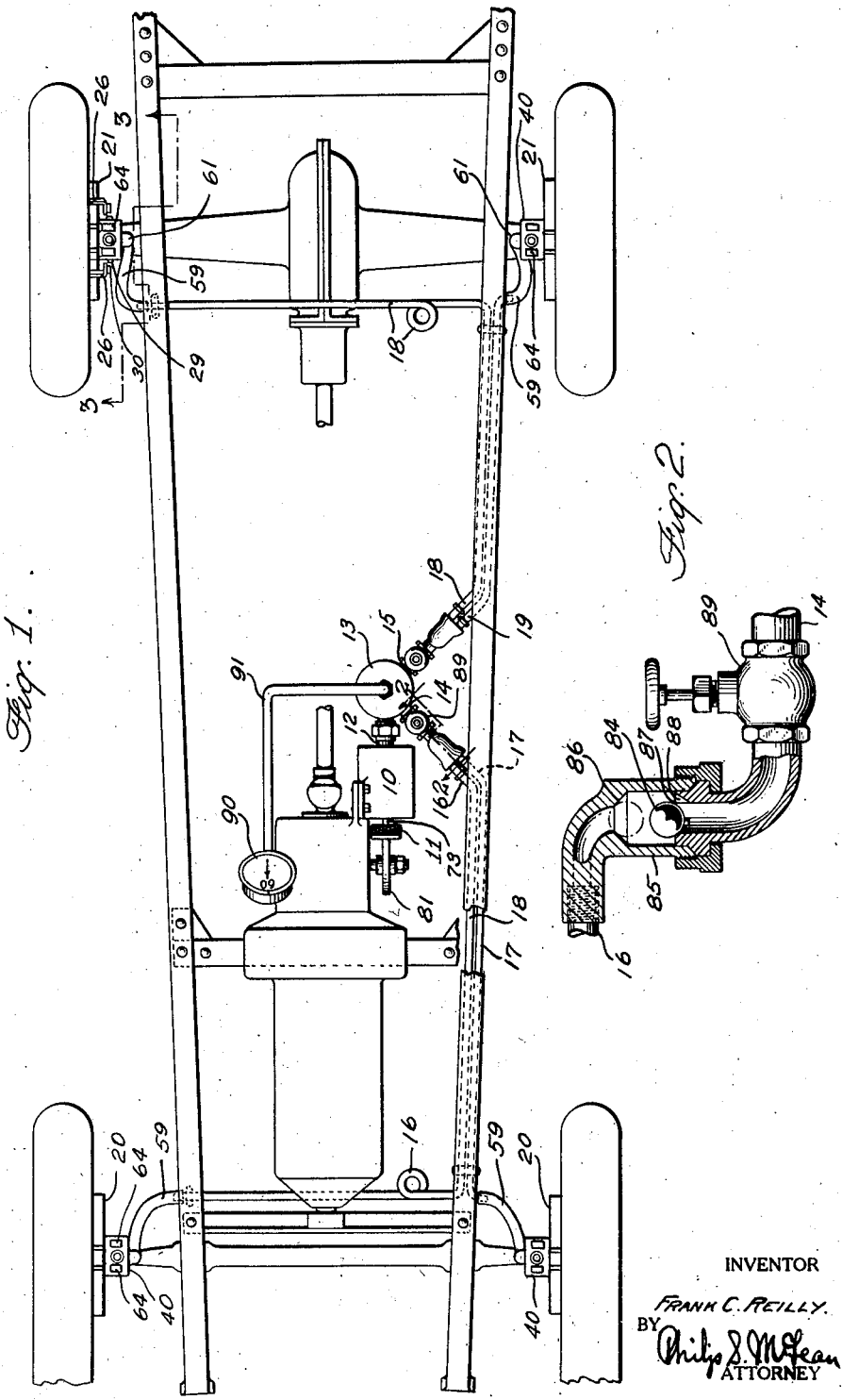

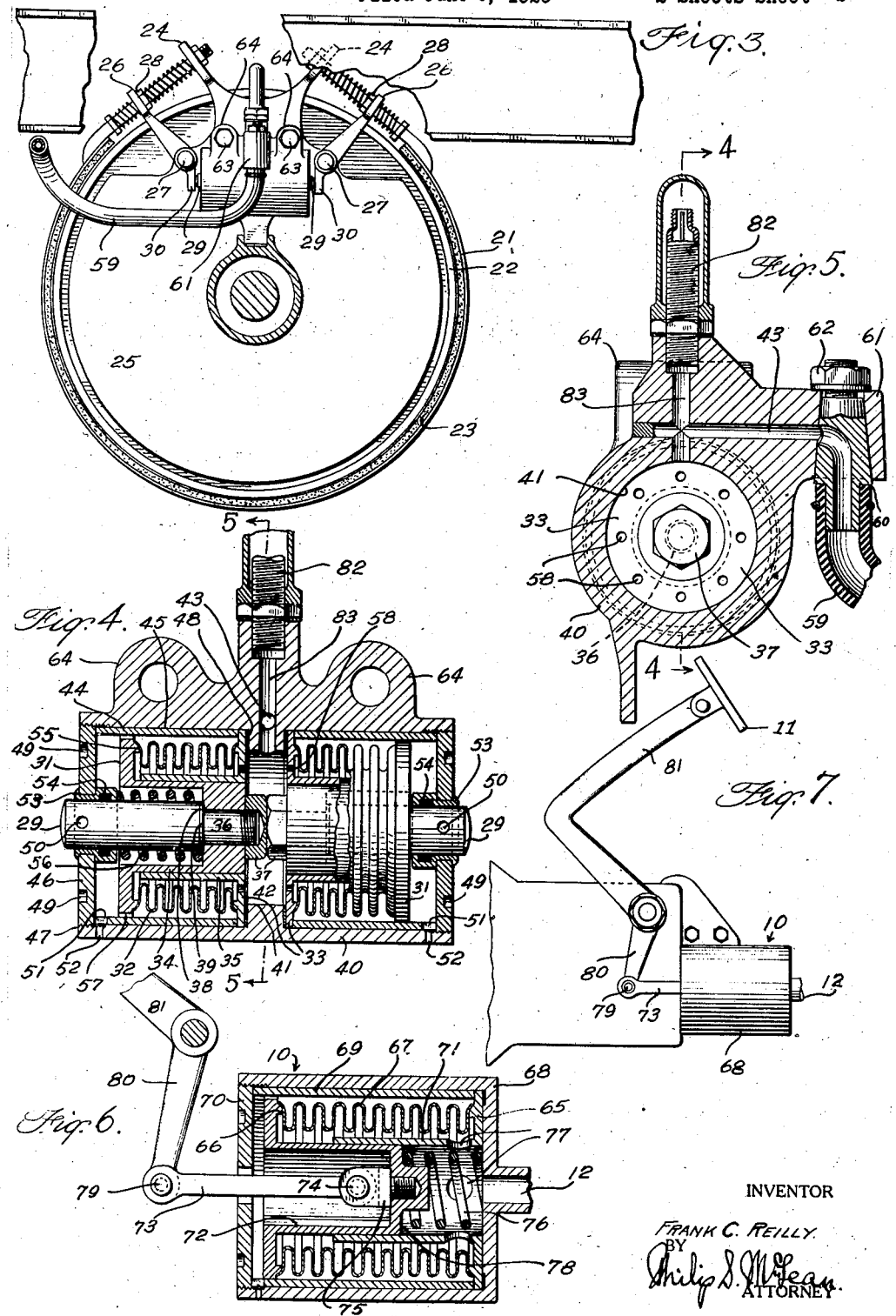

1,684,743

UNITED STATES PATENT OFFICE.

FRANK C. REILLY, OF NEW YORK, N. Y.

BRAKE SYSTEM.

Application filed June 5, 1925. Serial No. 35,108.

This invention relates particularly to the braking of automotive vehicles.

Special objects of the invention are to provide a practical form of pneumatic brake system, using air under pressure as the power transmitting medium and constructed so as to maintain full operating efficiency at all times and under all conditions.

Further important objects of the invention are to reduce the operating parts to the simplest form, to make such parts readily removable and interchangeable, to insure positive free action of the movable elements of the system, to assure quiet, constant easy operation of the mechanism, to render the system self-protective and to build the entire apparatus in a form readily applicable to present-day motor vehicle practice.

Among the special novel features of the invention is the use of expansible power transmitting elements included as part of a closed power circuit and which elements have uniformly expansible walls, guided to enable full free action of the same. These power elements are made as complete and readily interchangeable units, protected against extreme movements in either direction. Automatic valves interposed in the pressure conduits serve to automatically render any, for instance, the front or the rear wheel pair of brakes inoperative should they become defective by a leak or leaks occurring in the pressure conduits. To reduce the effort required to set the brakes, a certain pressure may be maintained in the system, just insufficient to overcome the brake releasing springs so that only a comparatively slight excess pressure need be accumulated to apply the brakes. The pressure generating means may also consist of a uniformly expansible and contractible element guided for direct free action and actuated for instance by a foot pedal.

Various other novel features of the invention will appear as the specification proceeds.

In the drawings accompanying and forming part of this specification, the invention is illustrated embodied in one of its practical commercial forms, but it should be understood that the structure may be modified and changed without departure from the broad spirit and scope of the invention as hereinafter defined and claimed.

Figure 1 is a broken plan view illustrating the adaptation of the invention to the chassis of a four-wheel brake motor vehicle.

Figure 2 is an enlarged part sectional view of the combined automatic and manual shut-off valves interposed in one of the pressure supply lines, said view being taken as on the plane of line 2—2 of Figure 1.

Figure 3 is a part sectional side view of one of the brake installations taken as on substantially the plane of line 3—3 of Figure 1.

Figure 4 is a further enlarged longitudinal sectional view of one of the double power applying units, as taken on substantially the plane of line 4—4 of Figure 5.

Figure 5 is a cross sectional view of such unit as taken on substantially the plane of line 5—5 of Figure 4.

Figure 6 is a longitudinal sectional view of the pressure creating unit.

Figure 7 is a side elevation of the same in its relation to the brake pedal.

In the general view, Figure 1, the pressure generating or actuating unit is indicated at 10 operated by foot pedal 11 and connected by piping 12 with a manifold 13 from which conduits 14, 15 extend, branches at 16, 17 and 18, 19 to carry the actuating fluid forwardly to the front wheel brakes 20 and rearwardly to the rear wheel brakes 21.

The brake structure is shown in Figure 3 as consisting in each instance of a brake drum 22 carried by the wheel and a surrounding brake band 23 guided at the ends in arms 24 of the brake band support 25. Levers 26 pivoted on the brake band support at 27 engage with abutments 28 on the end portions of the brake band for contracting the same on the drum, said levers being actuated by push rods 29 engaged with rock arms 30 dependent from the pivot studs 27 on which the levers 26 are mounted.

As shown in Figure 4, the push rods 29 constitute the power applying connections of the brake actuating units, said rods being directly connected with the movable heads of such units. These movable heads are designated 31 and are shown connected by corrugated expansible shells 32 with stationary heads 33, these relatively movable heads having a sliding telescopic connection provided by a tubular hub 34 on the movable head sliding in a sleeve or hub 35 projecting from the stationary head.

The push rods 29 are shown as having reduced end portions 36 extended through the inner ends of the hubs 35 and having nuts 37 engaged on the protruding screw threaded ends of the same. These nuts are shown as of cupped form having closed ends and are indicated as screwed tightly against the end walls of the hubs 34 so as to draw the shouldered portions 38 of the push rods firmly up against the faces of the hubs 34. Packing washers 39 are shown interposed at such shoulders to prevent leakage and as a further means for preventing leakage the reduced portions of the push rods may be given a "drive fit" in the movable heads.

In the double form of unit illustrated, two of the expansible members are mounted back to back within a supporting casing 40 against an intermediate annular shoulder 41 serving to separate the two members and providing a chamber 42 into which the fluid under pressure is admitted by a passage 43.

In order that each of the expansible power units may be mounted in place or removed as a unit in itself, the same are each shown as held in place by a sleeve or liner 44 seated in the bore 45 provided for such unit, bearing at its inner end against the rim of the stationary head and engaged at its outer end by a head 46 having a screw threaded engagement at 47 in the outer end of the bore and serving as a nut for forcing the unit down to a firm seat in the bore.

Packing washers are indicated at 48 providing a leak-tight joint between the stationary heads 33 and the abutment 41. Each expansible unit is thus held by a single fastening. Upon releasing such fastening, as by turning the securing head with a spanner or the like engaged with openings 49 provided therein, the entire unit may be lifted out of its seat. To facilitate withdrawal of these units the push rods are shown as having openings 50 therethrough to receive the point or hook of a suitable pulling tool.

Conversely, the brake actuating units can be mounted in operative relation by simply dropping them into the bores provided for them in the casing and applying the heads or covers 46 to force them firmly to their seats. To prevent the units from turning while the heads are being screwed in place, the sleeves or liners 44 are shown formed with positioning slots 51 in the outer ends of the same, designed to receive a holding tool inserted through openings 52 in the casing. These openings are shown positioned at the bottom of the casing so as to drain off any moisture that otherwise might collect within the sleeves.

The projecting portions of the push rods 29 are guided in the illustration in bushings 53 carried by the securing covers 46 and provided with a suitable packing 54 for excluding dust and adapted to carry a suitable lubricant.

The corrugate cylinders 32 are of special design so as to expand and contract uniformly throughout their length. For such purpose they are shown as of the same thickness throughout, and as corrugated with curvilinear bends and substantially flat parallel sided folds. With this structure there are no localized hinge points and the tendency of all the folds is to stretch and contract uniformly. Easy, free and quickly responsive action is thus assured and the positive guidance of the relatively movable heads by means of the oversliding hub parts prevents any mechanical strains on the flexing wall and keeps it free of frictional contact with other parts. The flexing wall is thus protected from all mechanical wear or strain and straight line movement of the push rod is maintained.

A convenient method of attaching the flexible wall to the end heads is that illustrated in which such heads are formed with curved beads 55 shaped to the curvature of the bends in the wall and the wall is cut substantially through the centers of two of such bends. A close fitting engagement is thus afforded without stretching or straining the wall and this provides also a maximum of contact between the parts, facilitating the securing of the same by soldering, brazing or the like.

The expansible cylinders are usually proportioned and assembled so that the inherent resiliency of the corrugate walls will tend to hold the cylinders collapsed or contracted. This force, however, need not be relied upon to hold the cylinders normally contracted. In the structure illustrated, springs 56 are provided surrounding the push rods bearing at their inner ends on the inner walls of the movable heads and at their outer ends against the guide bushings 53. The tubular hub portions of the movable heads form housings for these springs so that the use of such springs does not increase the overall dimensions of the device.

The movable heads 31 of the cylinders may have an easy sliding fit within the sleeves 44, but this is not considered necessary because of the positive guidance afforded by the oversliding engagement of the hub portions of the heads. When, however, this extra guiding feature is outlined, the movable heads are preferably made with one or more ports 57 to prevent such heads from acting as pistons within the sleeves and thus delaying or impairing the free action of the expansion cylinders.

The compressed air or other motive fluid enters the expansion cylinders by way of a series of ports 58 in the fixed heads 33 open to the central supply chamber 42. To allow for the relative movement between the wheels and the body structure, the pressure supply conduits terminate in sections of flexible tubing 59 and to provide readily detachable but secure joints with the brake actuating devices such flexible connections are shown equipped with perforated conical terminal lugs 60 secured in correspondingly conical seats 61 on the casings 40 by the screw fastenings 62. The brake actuating units themselves are shown removably secured on the brake band supports by bolts 63 extending through the perforated supporting lugs or ears 64 on the casings 40.

While the device for creating the brake actuating pressure may be in the form of a piston pump or other such device, it is preferred, for the sake of keeping the system leak-proof throughout, to employ a flexible compression cylinder of the same type as the expansion cylinders described. The pressure device is shown in this form in Figure 6 as embodying relatively fixed and movable heads 65, 66, connected by the flexible corrugated wall 67 and removably secured within the casing 68 by the liner 69 and screw cover 70. These heads have the oversliding telescopic hub portions 71, 72, but in this case an actuating member, the link 73, extends into and is pivotally connected at 74 with a stud 75 screwed into the end of the inner hub and a spring 76 is interposed between the end of this hub and the end wall of the casing to normally hold the cylinder fully distended. The sleeve or hub portion 71 of the fixed head is ported as indicated at 77 for passage of the fluid compressed within the corrugate wall into the space in front of the end wall 78 of the inner hub which operates in the nature of a piston forcing the fluid out the main pressure passage 12. The push link 73 is shown pivoted at 79 to the crank 80 of the foot pedal 81 so that force applied to this pedal is directly effective for creating the desired brake actuating pressure.

While the system may be designed to operate simply by an increase over atmospheric pressure, it is found preferable at the present time to carry an initial pressure insufficient to overcome the brake releasing springs but sufficient to require only a nominal increase in pressure to overcome the brake releasing means and set the brakes. As a practical example, where the brake releasing force amounts to approximately fifty pounds, the system may be operated under an initial pressure of say forty pounds, making it possible to apply the brakes with the desired force by an increase in pressure of only ten pounds or more. This initial pressure may be conveniently supplied by way of one or more pneumatic valves such as used on pneumatic tires and mounted, for instance, directly on the brake cylinder casings as indicated at 82 in Figure 5 and connected directly with the space 42 between the cylinder units by way of a passage 83. Such means provides for the convenient replenishment of pressure in the system, should that become necessary, and if in the act of replenishment too much pressure be supplied, no harm can result as that will only have the effect of setting the brakes, which then can be released by simply releasing some of the pressure through such valve, until the brakes "let go". By governing the initial pressure and its proportion to the brake releasing force, the system may be adjusted either for quick or more gradual brake application and hence the system may be readily adapted to meet different conditions or requirements.

In the event of any break in the pressure connections, it is desirable that both or all brakes in communication with the broken connection be rendered inoperative. This is particularly true of the four-wheel braking systems. To accomplish this automatically there is shown in Figures 1 and 2, a check valve structure comprising a stop valve 84 in a casing 85 interposed in each of the main pressure lines, said casing receiving the branch lines leading respectively to the front wheel brakes or the rear wheel brakes and having a valve seat 86 which when engaged by the ball shuts off communication to both of such branch passages. The braking of either of such branch passages will have the effect of releasing the air from the front of the valve and thus enabling the excess of pressure back of the valve to lift the same against the seat and thus prevent loss of pressure and shut off both brakes from the main supply. The ball is shown as normally resting on a seat 87 which simply acts as a back stop being notched as at 88 to permit normal flow of pressure fluid past the valve without actuating the same.

In addition to the automatic shut-off valves, manually controlled valves 89 are shown interposed in the main supply pipes 14, 15 in advance of the automatic valves which may be set by hand to close off either of the main lines to prevent possible leakage, after actuation of the automatic valves.

In order that the operator may be aware at all times of the pressure in the system, a pressure gage is shown at 90 connected by suitable piping 91 with the distributor or manifold 13. By observing this gage the operator may know the initial pressure and the brake applying pressures as well and may be warned of any loss in initial pressure which might result from breakage of any of the connections.

The invention, it will be seen, provides a relatively simple, practical air pressure system, readily applicable to existing motor vehicles and to various parts of the system, of quite inexpensive construction and in the nature of small compact units, readily accessible and easily removable and interchangeable. The main compression cylinder or pressure generator and the smaller expansion cylinders alike are in the form of leak-proof, flexible wall units, contracting and expanding uniformly, freely without friction and guided in direct straight line movements. The system being leak-proof throughout, does not suffer loss in power or efficiency. In case of accident to any one of a number of branch pressure lines, all of such lines are automatically cut off to prevent unequal operation of any one set of brakes and such automatic cut-off may be followed by a manual shut-off. The manually operable valves are useful also for shutting off the main lines when it may be desired to separately test any one set of brakes.

The initial pressure is conveniently supplied through an ordinary pneumatic valve or valves which provides also a convenient means for releasing pressure at any time, if that should be necessary, or for supplying additional pressure. Such additional pressure may be provided by an ordinary tire pump, this being a special advantage of the system that the actuating medium is always available and is not appreciably affected by freezing or other climatic conditions. If it should be found necessary to operate with a greater or a less initial pressure at different times, such requirements can readily be met by supplying additional or releasing part of the air pressure in the system. The relatively movable heads of the compressor and the brake actuating units provide efficient pressure surfaces and the freely stretching walls connecting these heads form flexible seals retaining and preventing any loss of pressure.

The positioning slot 51 in the edge of the liner 45 is made long enough to allow for the movement of the liner under the action of the screw cap 46 and this slot serves with the port 52 in the casing as a vent for the escape of any air surrounding the corrugate shell or in front of the movable pressure head 31. The action of the pressure head therefore is not opposed by any accumulation of pressure within the casing.

What is claimed is:

1. In a brake system or the like, a power unit comprising opposed relatively movable pressure heads having opposed oversliding hub portions and a corrugate substantially uniformly extensible and contractible shell enclosing the oversliding hub portions and connected with the pressure heads, said hubs being of tubular structure to form an enclosure, a spring within said enclosure, the inner tubular hub having a closed end wall and a power transmitting member connected with said closed end wall.

2. In a brake, a casing, a head seated in said casing and having a projecting tubular guide, a relatively movable head having a hub portion operating in said guide and expansible and contractible shell connecting the heads, a cap removably engaged with the casing and a connection between said cap and the stationary pressure head for removably securing the unit within the casing.

3. In a brake, a casing, a head seated in said casing and having a projecting tubular guide, a relatively movable head having a hub portion operating in said guide and expansible and contractible shell connecting the heads, a cap removably engaged with the casing and a connection between said cap and the stationary pressure head for removably securing the unit within the casing, said connection including a liner extending into the casing over the movable head and shell into engagement with the fixed head.

4. In apparatus of the character disclosed, a casing having bores entered from opposite sides and an intermediate annular shoulder at the inner ends of such bores and expansible and contractible power units removably seated in said bores in engagement with the intermediate annular shoulder, the movable portions of said power units having thrust transmitting elements with heads abutting in the space provided by the annular shoulder to limit the approaching movements of the relatively movable portions.

5. In apparatus of the character disclosed, a casing having bores entered from opposite sides and an intermediate shoulder at the inner ends of such bores, expansible power units entered in the bores in back to back relation and including fixed heads bearing against the intermediate shoulder, movable heads connected with the fixed heads by extensible shells, liners entered in the bores in engagement with the fixed heads and caps closing the bores and engaged with the liners to force the units into firmly seated relation.

6. In apparatus of the character disclosed, a casing having bores entered from opposite sides and an intermediate shoulder at the inner ends of such bores, expansible power units entered in the bores in back to back relation and including fixed heads bearing against the intermediate shoulder, movable heads connected with the fixed heads by extensible shells, liners entered in the bores in engagement with the fixed heads and caps closing the bores and engaged with the liners to force the units into firmly seated relation, the relatively fixed and movable heads of each pair having oversliding hub portions and push rods connected with the inner hub portions.

7. In apparatus of the character disclosed, a casing having bores entered from opposite sides and an intermediate shoulder at the inner ends of such bores, expansible power units entered in the bores in back to back relation and including fixed heads bearing against the intermediate shoulder, movable heads connected with the fixed heads by extensible shells, liners entered in the bores in engagement with the fixed heads and caps closing the bores and engaged with the liners to force the units into firmly seated relation, the relatively fixed and movable heads of each pair having oversliding hub portions and push rods connected with the inner hub portions, said push rods having sliding bearings in the caps and springs engaged between said caps and the ends of the inner hub portions.

8. In apparatus of the character disclosed, a casing having bores entered from opposite sides and an intermediate shoulder at the inner ends of such bores, expansible power units entered in the bores in back to back relation and including fixed heads bearing against the intermediate shoulder, movable heads connected with the fixed heads by extensible shells, liners entered in the bores in engagement with the fixed heads and caps closing the bores and engaged with the liners to force the units into firmly seated relation, said caps having screw engagement with the casing enabling variable adjustment of the units in the bores provided therefor.

9. In apparatus of the character disclosed, a casing having bores entered from opposite sides and an intermediate shoulder at the inner ends of such bores, expansible power units entered in the bores in back to back relation and including fixed heads bearing against the intermediate shoulder, movable heads connected with the fixed heads by extensible shells, liners entered in the bores in engagement with the fixed heads and caps closing the bores and engaged with the liners to force the units into firmly seated relation, said caps having screw engagement with the casing enabling variable adjustment of the units in the bores provided therefor, the casing having vents opening into the bores and the liners having slots for registry with such vents to receive a tool for positioning the liners.

10. In apparatus of the character disclosed, pressure units arranged in back to back relation and each comprising relatively fixed and movable heads with the movable heads having hub portions sliding in the fixed heads, expansive shells connecting the fixed and movable heads, push rods having screw threaded ends projecting through the hubs of the movable heads and closed nuts engaged over said projecting screw threaded ends.

11. In apparatus of the character disclosed, pressure units arranged in back to back relation and each comprising relatively fixed and movable heads with the movable heads having hub portions sliding in the fixed heads, expansive shells connecting the fixed and movable heads, push rods having screw threaded ends projecting through the hubs of the movable heads, closed nuts engaged over said projecting screw threaded ends and spring means for thrusting the movable heads toward each other to bring the closed nuts into abutting relation.

12. In apparatus of the character disclosed, a casing having bores entered from opposite sides and an intermediate annular shoulder at the inner ends of such bores, power units entered in the bores having stationary heads bearing against opposite sides of said shoulder, said heads having ports therein, movable heads opposed to the fixed heads, extensible shells connected between the relatively fixed and movable heads of each unit and means for admitting pressure into the space provided by the annular shoulder between the ported heads.

13. In apparatus of the character disclosed, a casing having bores entered from opposite sides and an intermediate annular shoulder at the inner ends of such bores, power units entered in the bores having stationary heads bearing against opposite sides of said shoulder, said heads having ports therein, movable heads opposed to the fixed heads, extensible shells connected between the relatively fixed and movable heads of each unit and means for admitting pressure into the space provided by the annular shoulder between the ported heads, including a passage in the casing terminating in a conical seat and a pressure conduit having a hollow conical terminal secured in said seat.

In witness whereof I have hereunto set my hand this 27th day of May, 1925.

FRANK C. REILLY.